US009273863B2

(12) United States Patent
Guercio et al.

(10) Patent No.: US 9,273,863 B2
(45) Date of Patent: Mar. 1, 2016

(54) LIGHT FIXTURE WITH AIRFLOW PASSAGE SEPARATING DRIVER AND EMITTER

(75) Inventors: Vincenzo Guercio, Wallkill, NY (US); Wengang Gao, Ningbo (CN); Jiang Hu, Shanghai (CN)

(73) Assignee: RAB Lighting Inc., Northvale, NJ (US)

( * ) Notice: Subject to any disclaimer, the term of this patent is extended or adjusted under 35 U.S.C. 154(b) by 479 days.

(21) Appl. No.: 13/611,140

(22) Filed: Sep. 12, 2012

(65) Prior Publication Data

US 2013/0242574 A1 Sep. 19, 2013
US 2015/0176829 A2 Jun. 25, 2015

Related U.S. Application Data

(60) Provisional application No. 61/533,781, filed on Sep. 12, 2011.

(51) Int. Cl.

| | |
|---|---|
| ***B60Q 1/06*** | (2006.01) |
| ***F21V 29/74*** | (2015.01) |
| ***F21V 29/00*** | (2015.01) |
| ***F21V 23/00*** | (2015.01) |
| ***F21V 29/15*** | (2015.01) |
| ***F21V 29/507*** | (2015.01) |
| ***F21V 29/76*** | (2015.01) |
| ***F21V 29/83*** | (2015.01) |
| *F21V 29/71* | (2015.01) |

(52) U.S. Cl.

CPC ............... *F21V 29/74* (2015.01); *F21V 23/008* (2013.01); *F21V 29/15* (2015.01); *F21V 29/2206* (2013.01); *F21V 29/507* (2015.01); *F21V 29/76* (2015.01); *F21V 29/83* (2015.01); *F21V 29/713* (2015.01)

(58) Field of Classification Search

USPC ........................................................ 362/373
See application file for complete search history.

(56) References Cited

U.S. PATENT DOCUMENTS

| | | | |
|---|---|---|---|
| 6,871,983 | B2 | 3/2005 | Jacob et al. |
| D573,288 | S | 7/2008 | Xu |
| 7,458,706 | B1 | 12/2008 | Liu et al. |
| D592,346 | S | 5/2009 | Gill |
| D596,764 | S | 7/2009 | Yang |
| D596,765 | S | 7/2009 | Chiu |
| D611,635 | S | 3/2010 | Gordin |
| 7,712,927 | B2 | 5/2010 | Shuai et al. |
| D623,779 | S | 9/2010 | Wang et al. |
| 7,802,902 | B2 | 9/2010 | Moss et al. |

(Continued)

OTHER PUBLICATIONS

Philips Burst Powercore with Full Snoot Glare Shield. [Retrieved on Jul. 1, 2011]. Retrieved from the Internet: <URL: www.colorkinetics.com/support/drawings/Burst_Powercore_Full_Snoot_Glare_Shield_Landscape.pdf>.

*Primary Examiner* — Nimeshkumar Patel
*Assistant Examiner* — Brenitra M Lee
(74) *Attorney, Agent, or Firm* — SmithAmundsen LLC; Kelly J. Smith; Dennis S. Schell

(57) ABSTRACT

An illustrative light fixture provides an emitter housing and a driver housing in a single fixture with an airflow channel defined between the emitter and driver housings. The airflow channel minimizes thermal conduction between the emitter and driver housings, and maximizes thermal convective cooling for at least one of the emitter housing and driver housing. The emitter housing includes vertical fins extending into the airflow chamber. The left and right sides of the emitter and driver housings define top and bottom edges that are respectively coplanar with the top and bottom edges of the vertical fins.

25 Claims, 15 Drawing Sheets

(56) References Cited

U.S. PATENT DOCUMENTS

| | | | | |
|---|---|---|---|---|
| 7,810,957 | B2 | 10/2010 | Zeng et al. | |
| 7,841,734 | B2 | 11/2010 | Wilcox | |
| D642,316 | S | 7/2011 | Zheng et al. | |
| D643,147 | S | 8/2011 | Guercio et al. | |
| D659,280 | S | 5/2012 | Guercio et al. | |
| 8,362,677 | B1 * | 1/2013 | Morejon et al. | 313/46 |
| 2005/0024870 | A1 | 2/2005 | Coushaine | |
| 2008/0089060 | A1 | 4/2008 | Kondo et al. | |
| 2009/0103308 | A1 | 4/2009 | Xu et al. | |
| 2009/0147520 | A1 | 6/2009 | Liu et al. | |
| 2009/0279314 | A1 | 11/2009 | Wu et al. | |

* cited by examiner

LIGHT FIXTURE WITH AIRFLOW PASSAGE SEPARATING DRIVER AND EMITTER

CROSS-REFERENCE TO RELATED APPLICATIONS

This application is a U.S. Non-Provisional Patent Application of U.S. Provisional Patent Application Ser. No. 61/533,781, filed Sep. 12, 2011, which is hereby incorporated by reference.

BACKGROUND

The present invention relates to cooling for lighting fixtures, and particularly, to cooling features to minimize thermal conduction between the light emitter and light driver and maximize thermal convection cooling of the driver.

Managing the temperature of light sources is often important to performance and longevity. This is particularly true with newer highly efficient lighting technology, for example, light sources such as LEDs or laser diodes. LEDs are generally selected to maximize the light output for a given power consumption at a reasonable cost. Because LED light sources operate at a much lower temperature than typical incandescent light sources, less energy is wasted in the form of heat production. However, LEDs tend to be more sensitive to operating temperature and the lower operating temperatures also provide a much smaller temperature difference between the LED and the ambient environment, thus requiring greater attention to thermal management to transfer and dissipate any excess heat generated by the LED driver and emitter so that the design operating temperature for the components are not exceeded.

As temperatures rise, the efficacy of the LED is reduced, reducing the light output. Also, increased operating temperature of the emitter reduces the lifespan of the LED. While the operating temperature is most critical for the LED emitter, the LED driver also generates and is affected by heat. As the temperature rises within a light fixture housing, raising the driver temperature, the lifespan of the driver is adversely affected causing premature failure. Operating at temperatures above the design limits can also cause LEDs to shift in wavelength providing undesirable shifts to the color of the light generated, can damage the LED junction greatly reduce the longevity and performance, and can potentially cause early complete failure of the LED.

To facilitate dissipation of heat, convection, conduction, and radiation are available modes of heat transfer. Thus, it is helpful to provide a light fixture with features that increase the surface area available for convective heat transfer of the heat generated by the LED to the environment around the light housing, for example, features may include cooling fins. Additionally, because more heat is generally generated by the LED emitter than the driver, it is helpful to ensure the heat transferred from the LED emitter is not transferred to the LED driver by conductive heat transfer. However, in most lighting applications, it is also important to maintain a desirable aesthetic appearance to the lighting fixture, and exposure of fins or other such cooling features and separating the emitter and driver into distinct housings tend to provide the light fixture with an undesirable 'alien' appearance and, in outdoor applications, promote trapping of debris on or around the cooling fins.

One design seeking to address these concerns provides a set of fins forming vertical airflow channels between a front emitter section and a rear driver section of the light fixture; however, the fins forming the airflow channels vary in length across the light fixture, are in clear view from the sides of the light fixture, and are recessed from the surface of the light fixture, therefore risking the collection of debris in outdoor applications. Thus, in the case of a linear array of emitters, thermal dissipation away from the emitters will vary depending on location relative to the varying sizes of fins. Additionally, the recess formed by the fins may tend to capture debris in outdoor applications. Furthermore, the visibility of the fins from the sides of the light fixture is undesirable.

Therefore, it is desirable to provide a unitary lighting fixture design that minimizes the thermal conduction between the emitter and driver housings, maximizes cooling by thermal convection for the light emitter, shields the cooling features from as many viewing angles as practical, and minimizes the opportunity for debris to be caught in or around the cooling features.

SUMMARY

The present invention may comprise one or more of the features recited in the attached claims, and/or one or more of the following features and combinations thereof.

An illustrative light fixture provides a light emitter housing and a light driver housing in a single fixture with an airflow channel defined between the emitter and driver housings. The airflow channel minimizes thermal conduction between the emitter and driver housings, and maximizes thermal convective cooling for at least one of the emitter housing and driver housing. The emitter housing defines vertical fins extending into the airflow chamber. The left and right sides of the emitter and driver housings define top and bottom edges that are respectively coplanar with the top and bottom edges of the vertical fins.

In one illustrative embodiment of a light fixture for a light source having an emitter and driver, an emitter housing defines an emitter mount, the emitter is coupled to the emitter mount, the emitter housing defines a rear surface, a left side, and a right side, and each of the left and right side define a top edge and a bottom edge. The light fixture further includes a driver housing, the driver is coupled to the driver housing, the driver housing defines a front surface, a left side, and a right side, and each of the left and right side define a top edge and a bottom edge.

The light fixture further includes an airflow passage defined by a space between the rear surface of the emitter housing and the front surface of the driver housing and a first plurality of fins located in the airflow passage and defining vertical oriented airflow channels, the vertical oriented airflow channels open to a top side and a bottom side of the fixture, and top and bottom edges are defined by each of the first plurality of fins, and the top edges of the first plurality of fins are coplanar with the top edges of the left side and the right side of each of the driver housing and the emitter housing. At least a portion of each of the first plurality of fins span the space between the emitter housing and the driver housing. The bottom edges of the first plurality of fins can also be coplanar with the bottom edges of the left side and the right side of each of the driver housing and the emitter housing. The rear surface of the emitter housing can define the first plurality of fins, the first plurality of fins are in thermal conductivity with the emitter mount.

In one illustrative embodiment a plane is defined by the top edges of the first plurality of fins and the top edges of the left and right sides of the driver housing and the emitter housing. The plane can be flat, or alternatively, can be curvilinear in a direction from a front of the emitter housing to a back of the driver housing. Additionally, the left sides of the emitter and driver housings can be coplanar; and the right sides of the emitter and driver housings can be coplanar. The first plurality of fins can be evenly spaced. At least one fastener securing the emitter housing to the emitter housing can be fully enclosed by the emitter housing and the driver housing.

In one illustrative embodiment the left sides of the emitter and driver housings enclose a left end of the airflow passage and the right sides of the emitter and driver housings enclose a right end of the airflow passage. In an alternative embodiment, the left sides of the emitter and driver housings define a left side opening of the airflow passage, the left side opening spanning from the top edges of the left sides to the bottom edges of the left sides; and the right sides of the emitter and driver housings define a right side opening of the airflow passage, the right side opening spanning from the top edges of the right sides to the bottom edges of the right sides, and the first plurality of fins are scalloped inward toward the emitter housing along their vertical length, the fins and the driver housing define an open space that extends horizontally between the left side opening and right side opening of the fixture.

In one illustrative embodiment, a second plurality of fins is defined by the driver housing and each of the first plurality of fins is aligned with one of the second plurality of fins. Top edges of the second plurality of fins can be coplanar with the top edges of the first plurality of fins.

In one illustrative embodiment, a top surface is defined by the emitter housing, and the top edges of the first plurality of fins are coplanar with the top surface of the emitter housing. Additionally, or alternatively, a top surface is defined by the driver housing, and the top edges of the first plurality of fins are coplanar with the top surface of the driver housing.

In one illustrative embodiment, at least one of the rear surface of the emitter housing and the front surface of the driver housing extends into the airflow passage.

In another illustrative embodiment, a light fixture for a light source having an emitter and driver, includes an emitter housing defining an emitter mount, the emitter coupled to the emitter mount, the emitter housing defining a rear surface, a left side, a right side, and a top surface; a driver housing, the driver coupled to the driver housing, the driver housing defining a front surface, a left side, and a right side; an airflow passage defined by a space between the rear surface of the emitter housing and the front surface of the driver housing; and a first plurality of fins located in the airflow passage and defining vertical oriented airflow channels, the vertical oriented airflow channels opening to a top side and a bottom side of the fixture, top and bottom edges defined by each of the first plurality of fins; and wherein the top edges of the first plurality of fins are coplanar with the top surface of the emitter housing. At least a portion of each of the first plurality of fins span the space between the emitter housing and the driver housing. The light fixture can further include a second plurality of fins defined by the driver housing, and each of the second plurality of fins are aligned with one of the first plurality of fins. The driver housing can further define a top surface and the top edges of the first plurality of fins are coplanar with the top surface of the driver housing.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which.

DESCRIPTION OF THE ILLUSTRATIVE EMBODIMENTS

Figure 1:
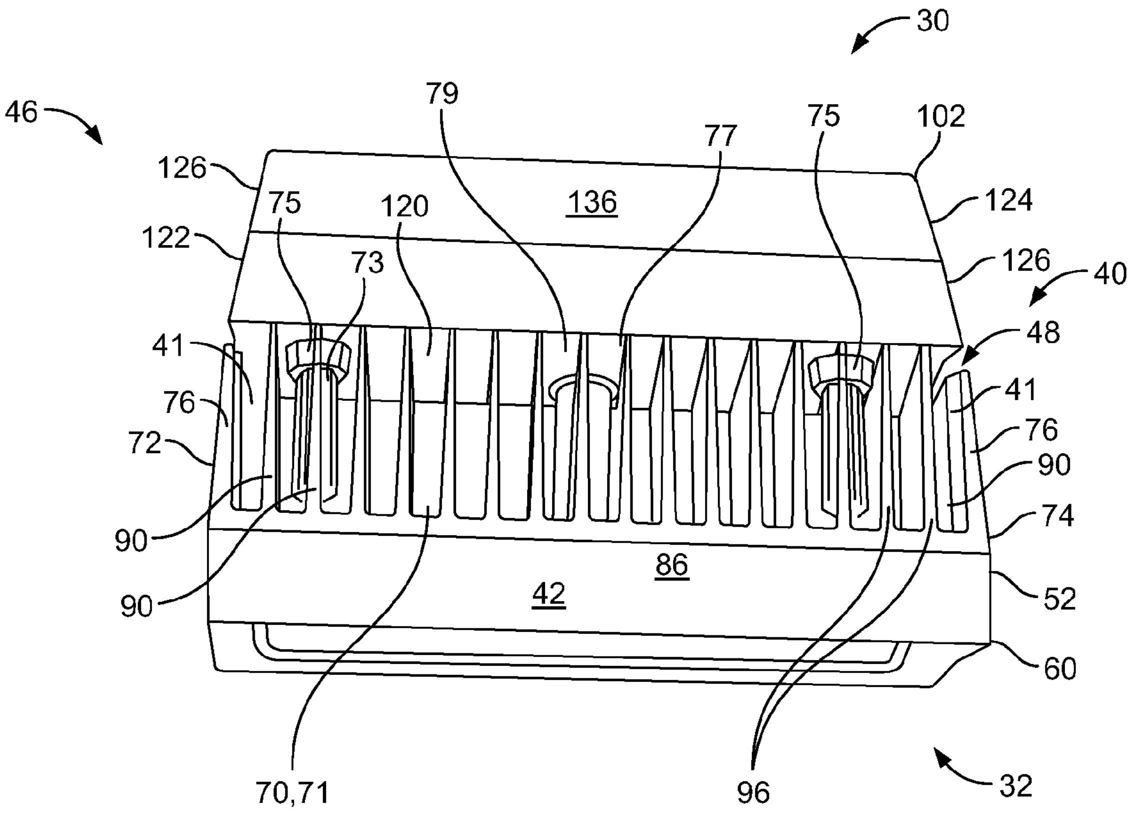
FIG. 1 is a top perspective view of a first illustrative lighting fixture according to the present invention.

For the purposes of promoting and understanding the principals of the invention, reference will now be made to one or more illustrative embodiments illustrated in the drawings and specific language will be used to describe the same.

Figure 2:
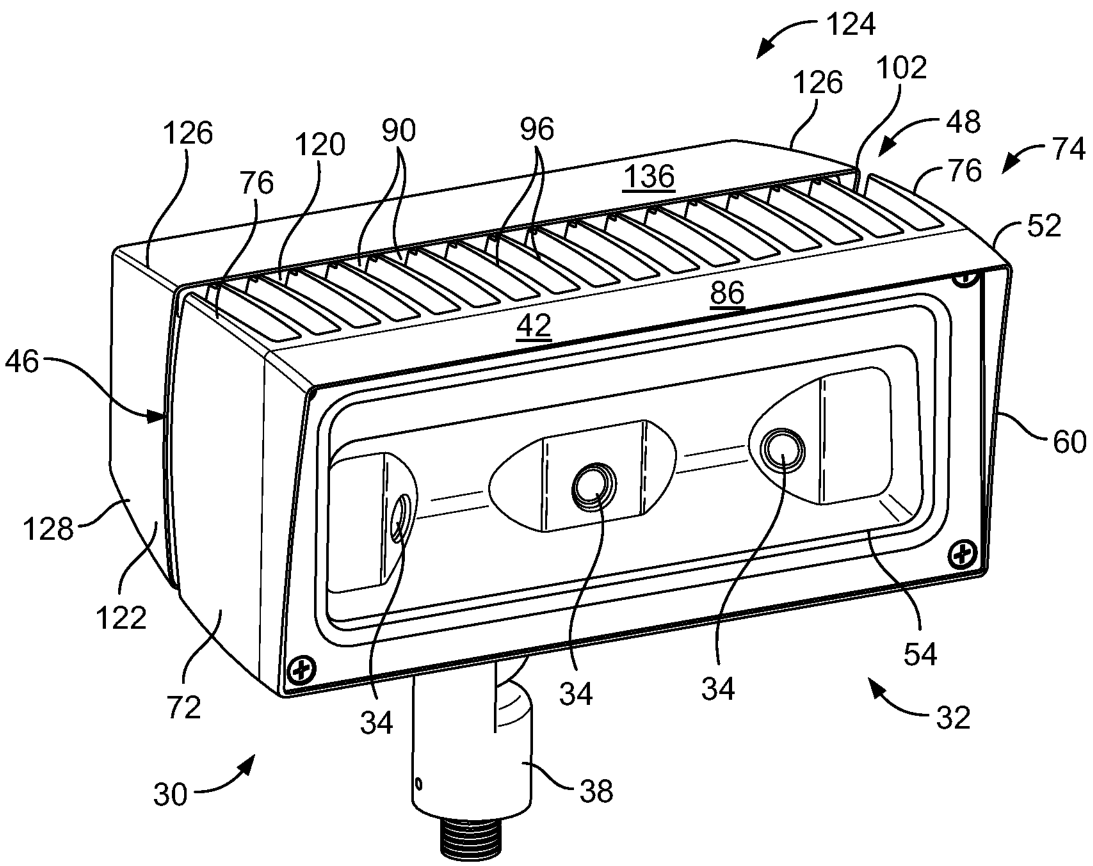
FIG. 2 is a top, front perspective view of the lighting fixture of FIG. 1.
Figure 3:
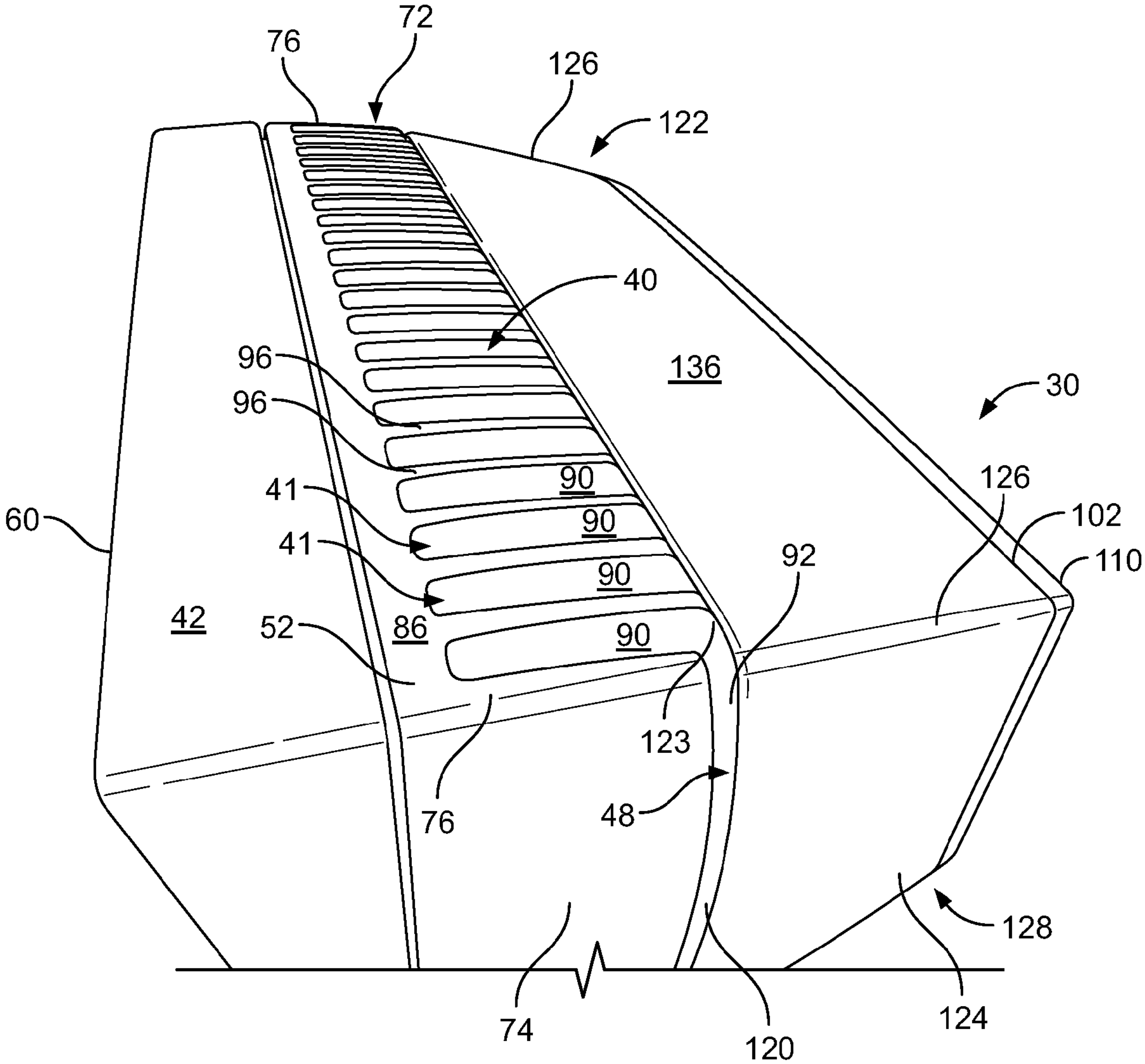
FIG. 3 is a top, right side perspective view of the lighting fixture of FIG. 1.
Figure 4:
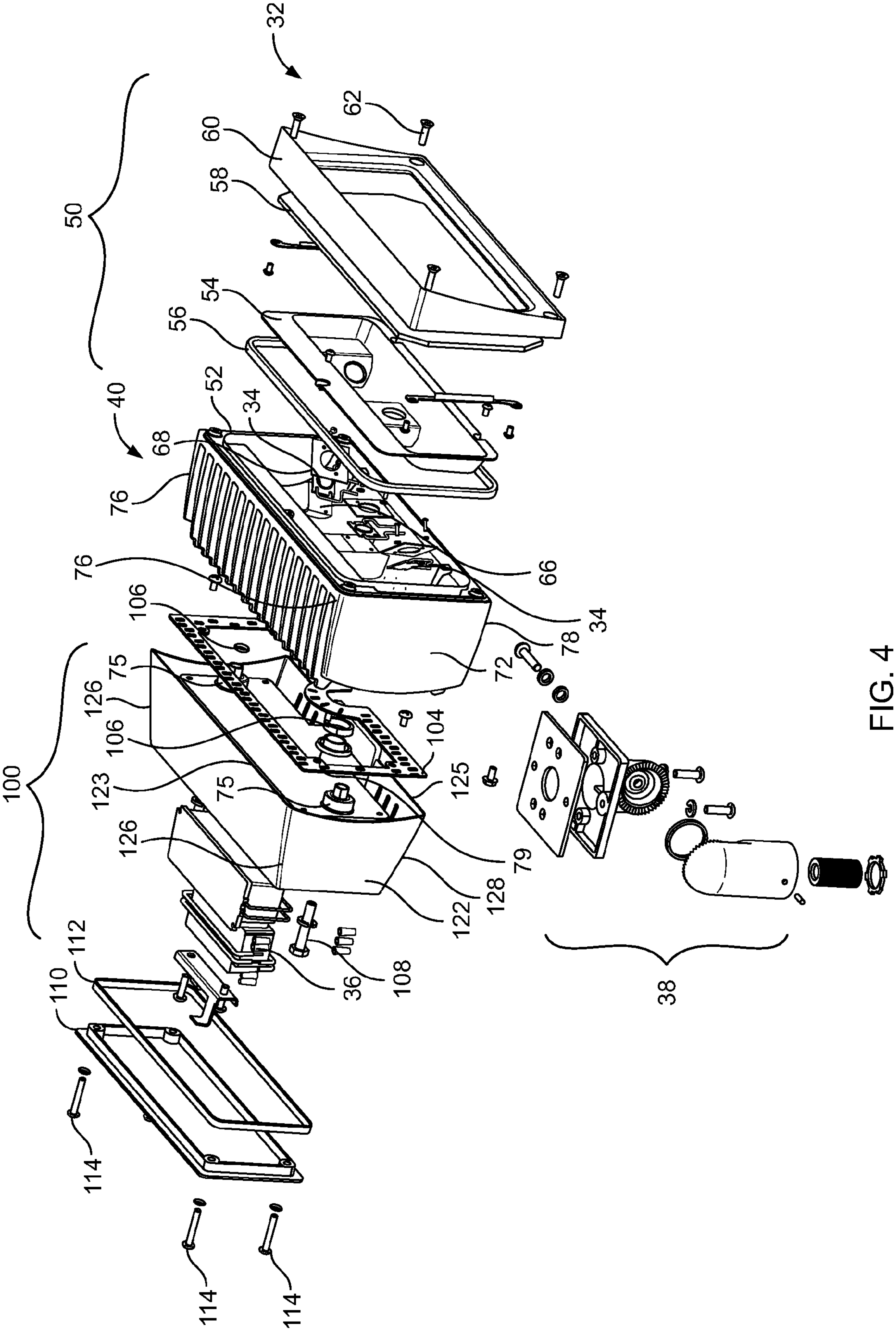
FIG. 4 is an exploded perspective view of the lighting fixture of FIG. 1.

Referring to FIGS. 1-8, a first illustrative embodiment of a light fixture 30 according to the present invention is illustrated. Referring to FIG. 4, the light fixture 30 includes a light source 32, including an emitter 34 (as used herein, "emitter" refers to a single emitter or an array of emitters) and a driver 36 (as used herein, "driver" refers to a single driver or an array of drivers). For example, light source 32 may be, but is not limited to, an LED emitter 34 and associated driver 36, as are typically used in the commercial lighting industry. For example, the associated driver 36 converts AC power to appropriate DC power and may also include additional LED power and control features. The fixture 30 can further include an emitter section 50, a driver section 100, a mount 38, and an airflow passage 40 located between the emitter section and the driver section.

The emitter section 50 includes an emitter housing 52, for example, die cast aluminum or an aluminum alloy. The emitter 34 is thermally coupled and mounted to the emitter housing 52. As it typical of commercial lighting fixtures, the emitter section 50 may also include components that enclose the emitter 34 with emitter housing 52, for example, including a light reflector 54, water seal 56, lens 58, and frame and hood 60, and fasteners 62 for securing the frame and hood, lens, water seal, and light reflector to the emitter housing.

The driver section 100 includes a driver housing 102, for example, die cast from aluminum or an aluminum alloy. The driver housing 102 is coupled with the emitter housing 52, for example, with fasteners 108. Thermal insulator 104 may be located between the emitter housing 34 and driver housing 32, for example, either partially, or fully insulating the driver housing from thermal conduction with the emitter housing. As it typical of commercial lighting fixtures, the driver section 100 may also include components that enclose the driver 36 with driver housing 102, for example, including a driver cover 110, water seal 112, and fasteners 114 for securing the water seal and cover to the driver housing. Advantageously, the fasteners 108 can be enclosed within the emitter housing 34, driver housing 32, and driver cover 110, providing a more aesthetically pleasing look to the light fixture 30.

The emitter housing 52 defines one or more emitter mounts 66 on a front surface 68 of the emitter housing. The emitter mounts 66 provide structural mass for increased conduction of heat away from the emitter 36, and also provide relative mounting orientation for the emitter 36. The emitter 36 is coupled to the one or more emitter mounts 66.

Figure 6:
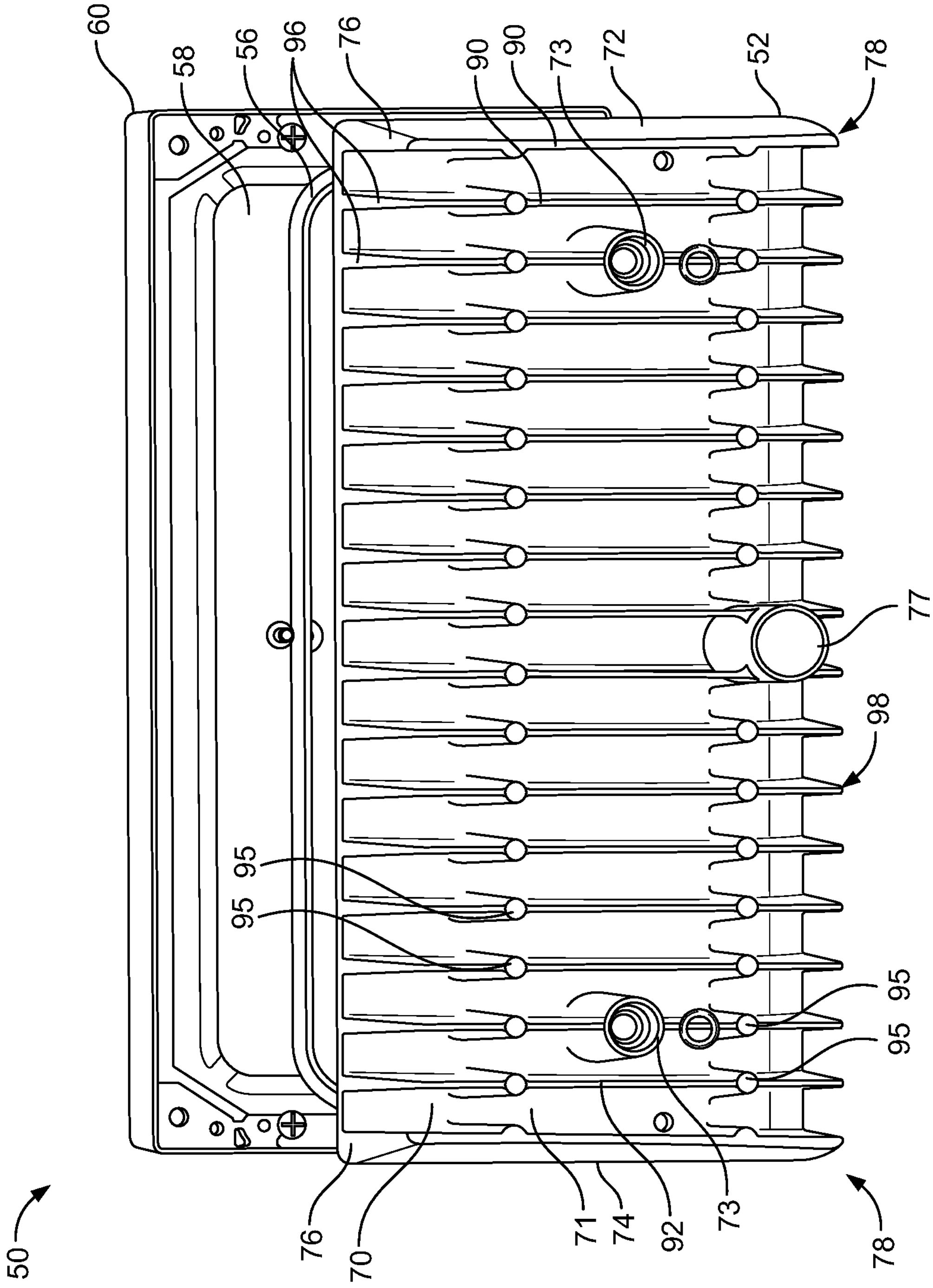
FIG. 6 is an exploded rear, top perspective view of the emitter section of the lighting fixture of FIG. 1.

Referring to FIGS. 2 and 6, the emitter housing 52 also defines a rear surface 70, a left side 72, and a right side 74, and each of the left and right side define a top edge 76 and a bottom edge 78. The driver housing 102 defines a front surface 120, a left side 122, and a right side 124, and each of the left and right side define a top edge 126 and a bottom edge 128.

Referring to FIGS. 1, 3, 6, and 8, the airflow passage 40 is defined by a space between the rear surface 70 of the emitter housing 52, including an intermediate protruding portion 71 of the rear surface, and the front surface 120 of the driver housing 102. A plurality of fins 90 (FIG. 3) are located in the airflow passage 40 and define vertical oriented airflow channels 41, the vertical oriented airflow channels open to a top side 42 (FIG. 3) and a bottom side 44 (FIG. 8) of the fixture 30. The plurality of fins 90 can be defined by the rear surface 70 of the emitter housing 52, thus, the plurality of fins 90 are in thermal conductivity with the emitter mount 66 and emitters 34. At least a portion of each of the fins 90 can span the space between the emitter housing 52 and the driver housing 102, whether or not the fins 90 are in actual contact with the front surface 120 of the driver housing.

Figure 8:
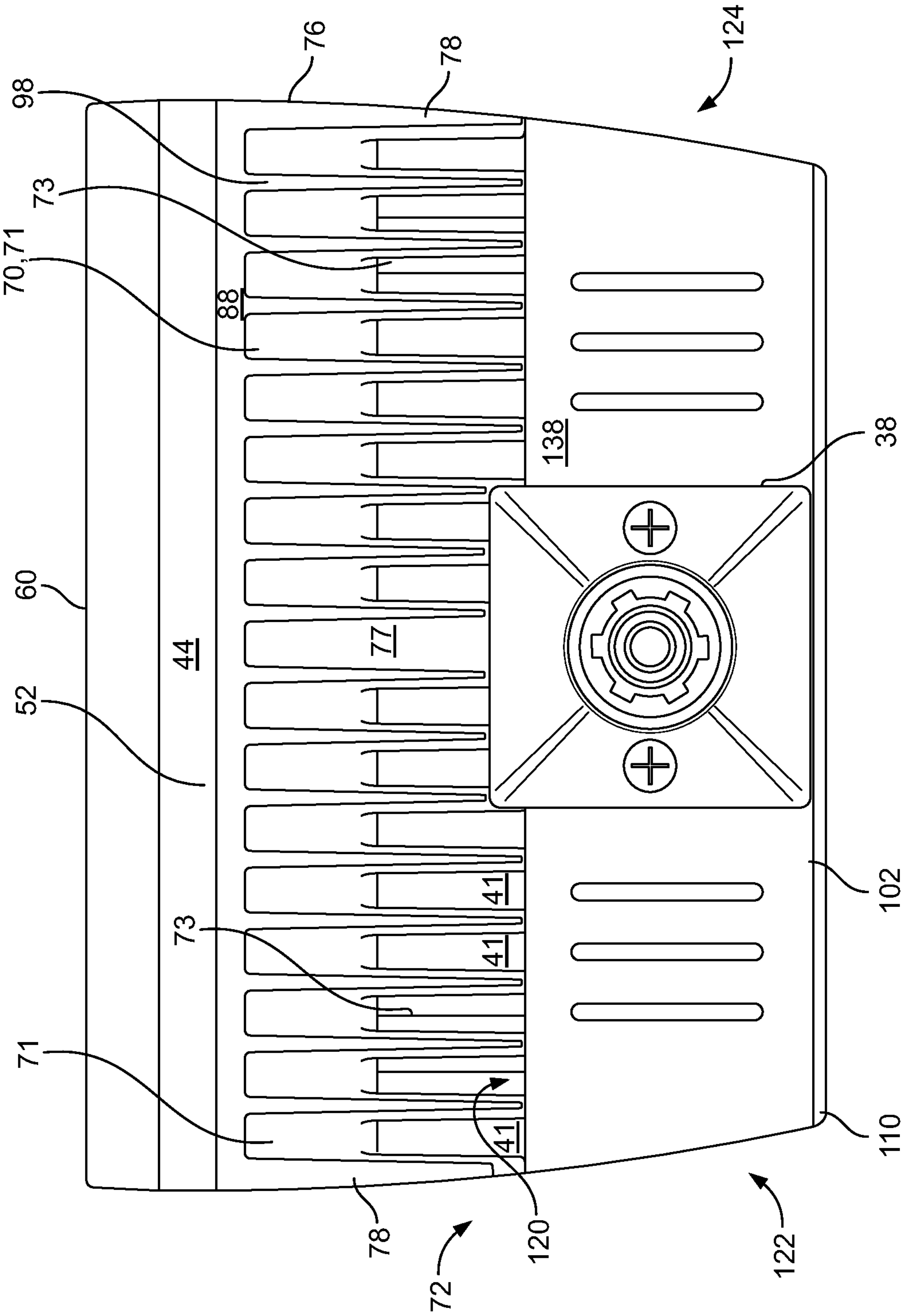
FIG. 8 is a bottom view of the lighting fixture of FIG. 1.

Referring to FIGS. 3 and 8, a top 42 and a bottom 44 of the light fixture 30 can be planar, without recesses other than the airflow channels 41. More specifically, top edges 96 and bottom edges 98 are defined by each of the first plurality of fins 90. The top edges 96 of the first plurality of fins 90 are coplanar with the top edges 76, 126 of the left side 72, 122 and the right side 74, 174 of each of the emitter housing 52 and the driver housing 102. Similarly, the bottom edges 98 of the first plurality of fins are coplanar with the bottom edges 78, 128 of the left side 72, 122 and the right side 74, 124 of each of the emitter housing 52 and the driver housing 102.

In the first illustrative embodiment 30, where a planar top 42 is defined by a top surface 86 of the emitter housing, and the top edges 96 of the plurality of fins 90 are coplanar with the top surface 86 of the emitter housing. Additionally, the planar top 42 is further defined by a top surface 136 of the driver housing 102, and the top edges 96 of the plurality of fins 90 and the top surface 86 of the emitter housing are also coplanar with the top surface 136 of the driver housing. The top edges 96 of fins 90 being flush with the top surfaces 86 and 136 provides a more aesthetically pleasing appearance, and lessen the likelihood that debris will catch among the interface between the fins 90 and the top surface 86 and 136 since they join and are flush rather than recessed or otherwise non-planar.

Figure 7:
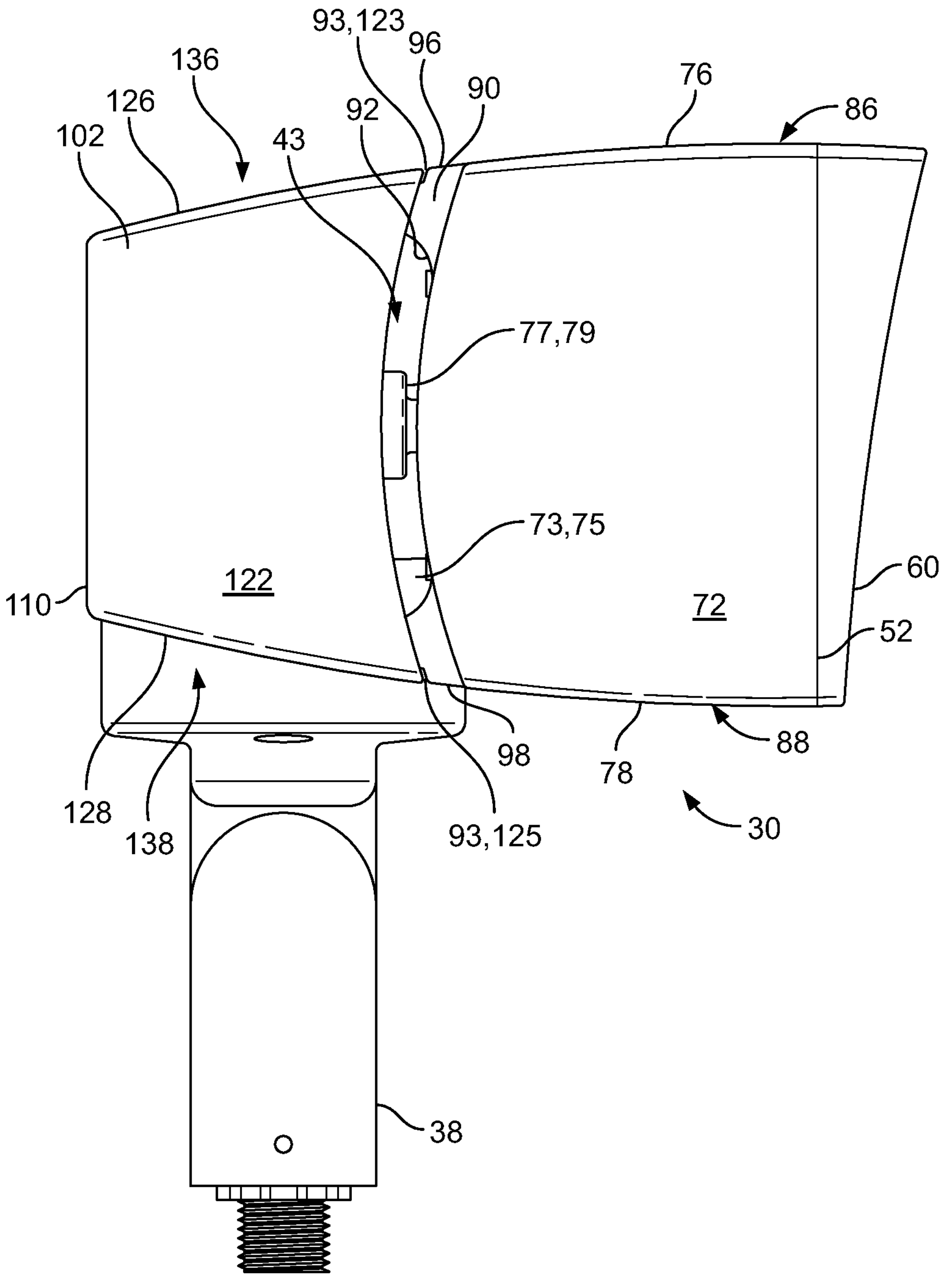
FIG. 7 is a right side view of the lighting fixture of FIG. 1.

Referring to FIGS. 7 and 8, in the first illustrative embodiment 30, a planar bottom 44 is similarly defined by coplanar bottom surface 88 of the emitter housing 52, bottom surface 136 of the driver housing 102, and bottom edges 98 of the plurality of fins 90.

The planes defined by top 42 and bottom 44 can be flat, about flat, for example as in the first illustrative light fixture 30, or curvilinear, for example as shown in the second illustrative light fixture 230, discussed below. Additionally, the left sides 72 and 122 of the emitter and driver housings 52 and 102 can be coplanar, and the right sides 74 and 124 of the emitter and driver housings can be coplanar.

The plurality of fins 90 can be evenly spaced between sides 72 and 74, thus providing equal or about equal sized airflow channels 41. Because the fins 90 are also equal or about equal in length between the top edges 96 and bottom edges 98, the light fixture 30 can provide uniform or about uniform cooling across the span between the sides 72 and 74. Thus, if as in the illustrative light fixture 30, the emitter 34 includes a horizontally arranged array, the emitters 34 can also be spaced to receive equal or about equal conductive and convective cooling from the heat transfer through mounts 66 and fins 90.

Figure 5:
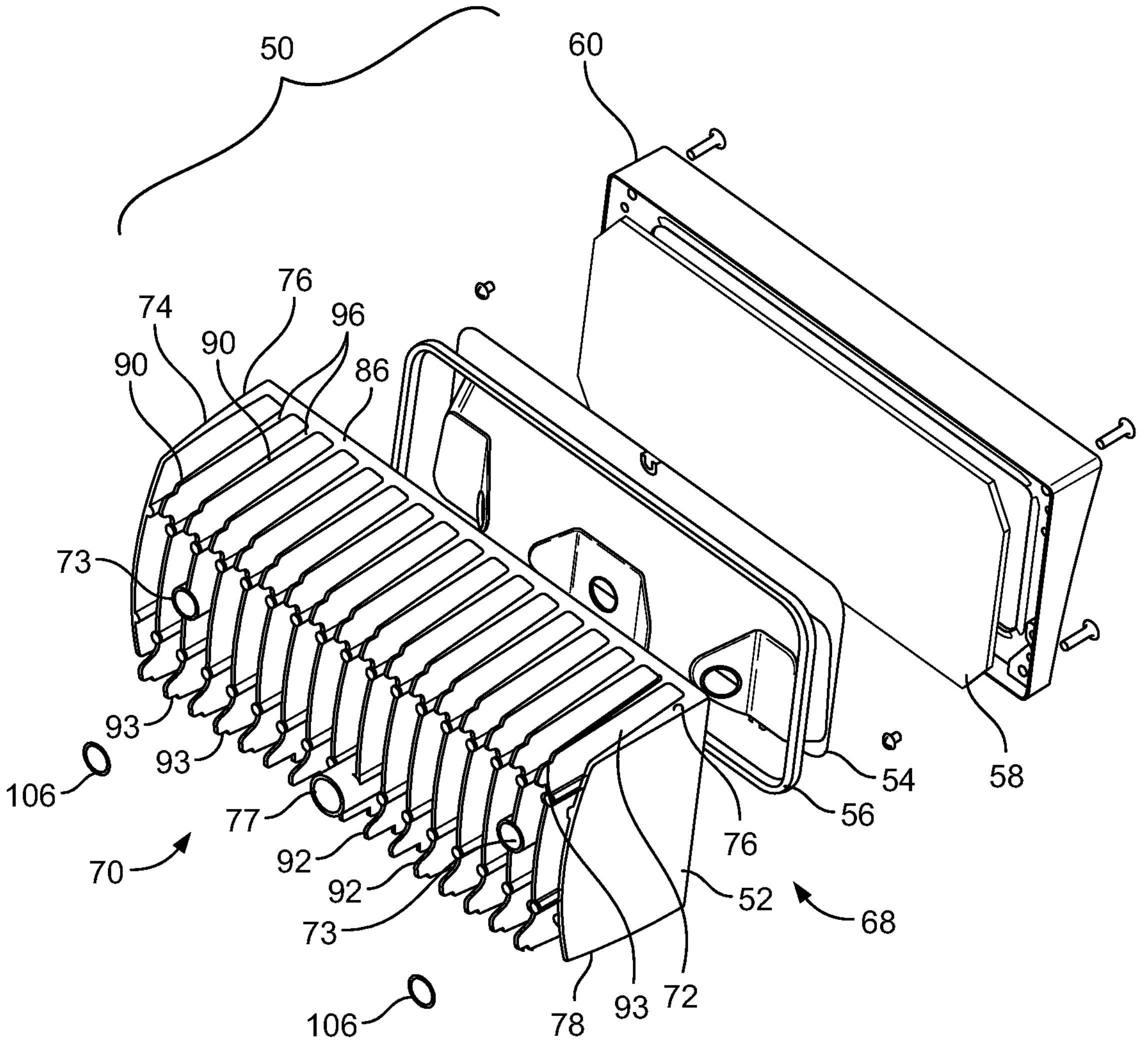
FIG. 5 is an exploded top, rear perspective view of the emitter section of the lighting fixture of FIG. 1.

Referring to FIGS. 1-3, in the first illustrative embodiment of the light fixture 30, the left sides 72 and 122 of the emitter and driver housings 52 and 102 define a left side opening 46 of the airflow passage 40, and the right sides 74 and 124 of the emitter and driver housings define a right side opening 48 of the airflow passage. Referring to FIGS. 5 and 7, additionally, the rear edges 92 of the fins 90 are scalloped inwardly toward the emitter housing along their vertical length, providing an open space 43 that extends horizontally between the left side opening 46 and right side opening 48 of the fixture 30, thus visually reducing the mass of the light fixture 30 from the sides, and providing an additional path through which air may flow to further advance cooling.

Referring to FIGS. 4 and 5, the emitter housing 52 defines fastener tubes 73, and the driver housing defines 102 defines mating fastener tubes 75 (FIG. 4), which together receive fasteners 108 that secure the emitter housing together with the driver housing, and seals 106 that provide a watertight seal between each respective pair of tubes 73 and 75 to prevent water intrusion into the interior of the emitter housing and driver housing. The emitter housing 52 further defines wire passageway 77 and mating wire passageway 79 (FIG. 4), which together allow passage of wires connecting the emitter 34 to the driver 36, while the seal 106 in combination with the passageways 77 and 79 provide a watertight seal.

Referring to FIGS. 3, 5, and 7, in the illustrative light fixture 30, notches 93 are defined by fins 90 adjacent the rear edge 92 and both the top edge 96 and the bottom edge 98. The notches 93 contact with an interior corner of a top lip 123 and bottom lip 125 of the driver housing 102. The contact provides added stability of the emitter housing 52 relative to the driver housing 102 that is otherwise coupled at tubes 73 and 75 and passageways 77 and 79 by seals 106, for example, elastomeric o-rings that allow some relative movement. The contact of notches 93 and lips 123 and 125 provide minimal thermal conductivity since the contact areas are small, and the notches 93 are distal on the fins 90 of the heat generated by emitters 34. In other alternative embodiments, the fins 90 do not contact the driver housing 102, thus further maximizing thermal isolation between the emitter housing 52 and driver housing 102.

Referring to FIG. 6, extraction pins 95 defined by fins 90 aid in extracting the emitter housing 52 from the die or mold used to cast or otherwise for it without damaging the long, thin fins 90.

In one illustrative embodiment the left sides of the emitter and driver housings enclose a left end of the airflow passage and the right sides of the emitter and driver housings enclose a right end of the airflow passage.

Referring to FIGS. 9-15, a second illustrative embodiment of a light fixture 230 according to the present invention is illustrated. Many of the features of the first illustrative light fixture 30 discuss above are or can be incorporated into the second light fixture 230; therefore, for brevity, many of the specific features that are the same for light fixtures 30 and 230 will not be repeated below.

Figure 9:
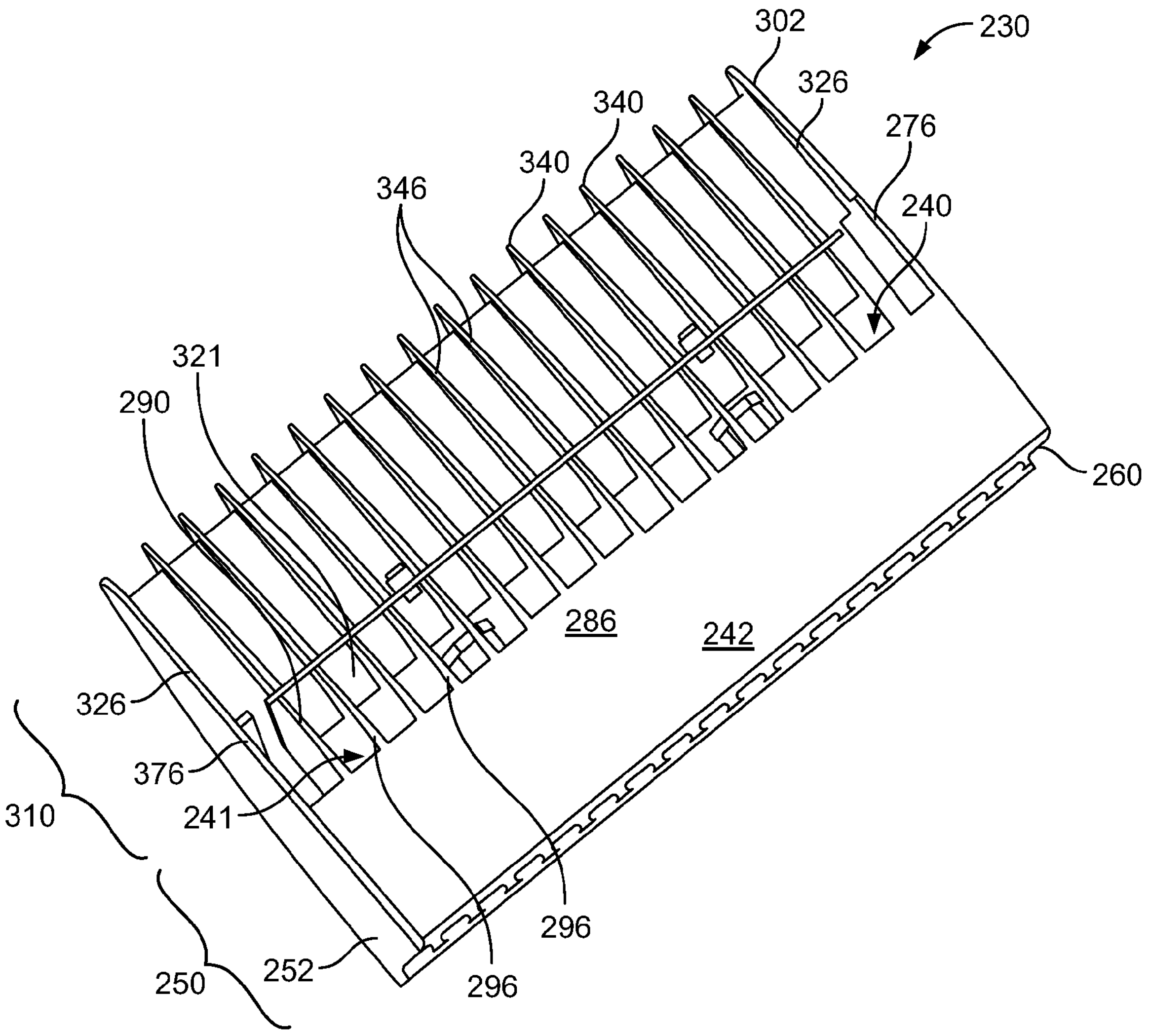
FIG. 9 is a top perspective view of a second illustrative lighting fixture according to the present invention.
Figure 10:
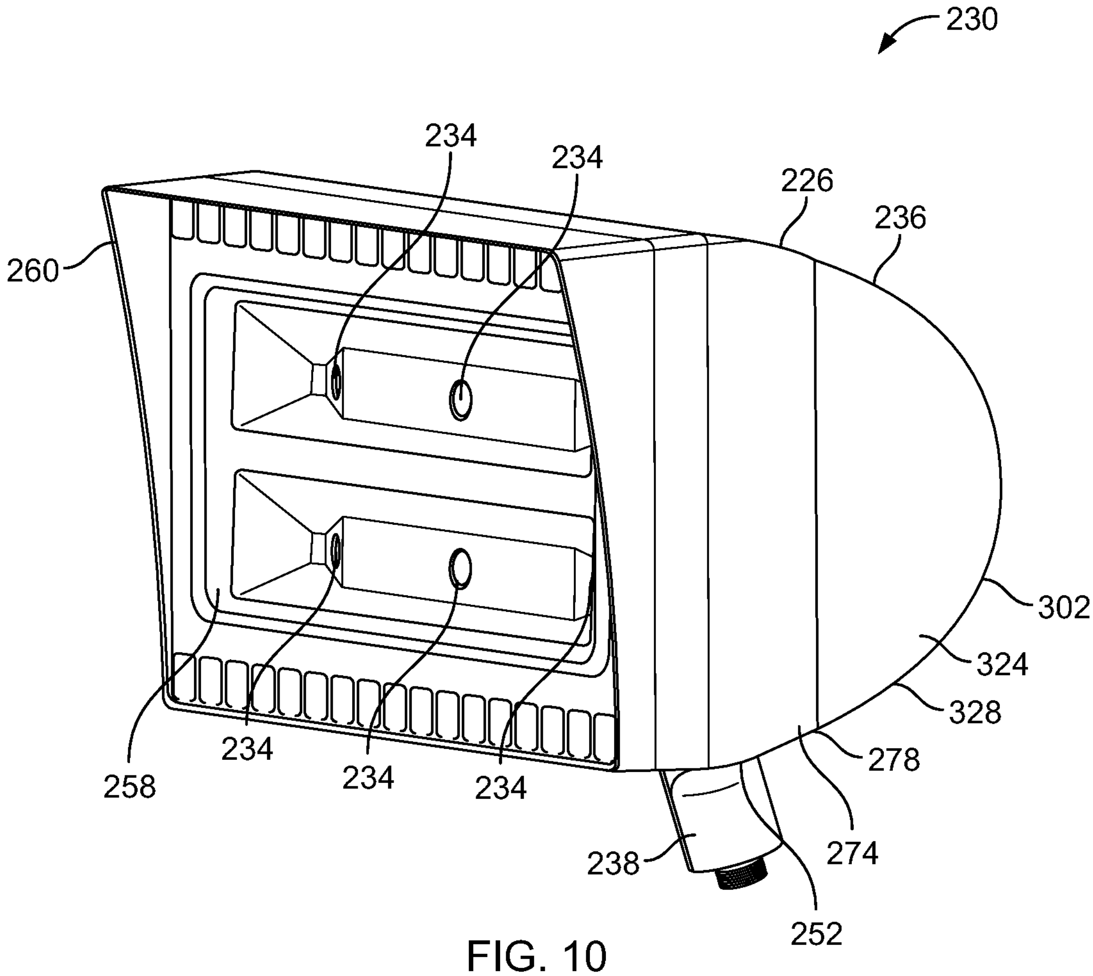
FIG. 10 is a right side perspective view of the lighting fixture of FIG. 9.

Referring to FIGS. 9 and 10, the light fixture 230 includes an emitter 234 and a driver 236 (not shown). The fixture 230 can further include an emitter section 250, a driver section 300, a mount 238, and an airflow passage 240 located between the emitter section and the driver section.

The emitter section 250 includes an emitter housing 252, for example, die cast from aluminum or an aluminum alloy. The emitter 234 is thermally coupled and mounted to the emitter housing 252. As it typical of commercial lighting fixtures, the emitter section 250 may also include components that enclose the emitter 234 with emitter housing 252, for example, including a light reflector 254, lens 258, and frame and hood 260.

The driver section 300 includes a driver housing 302, for example, die cast from aluminum or an aluminum alloy. The driver housing 302 is coupled with the emitter housing 352, for example, with fasteners (not shown). As it typical of commercial lighting fixtures, the driver section 300 may also include components that enclose the driver 236 within driver housing 302.

Figure 12:
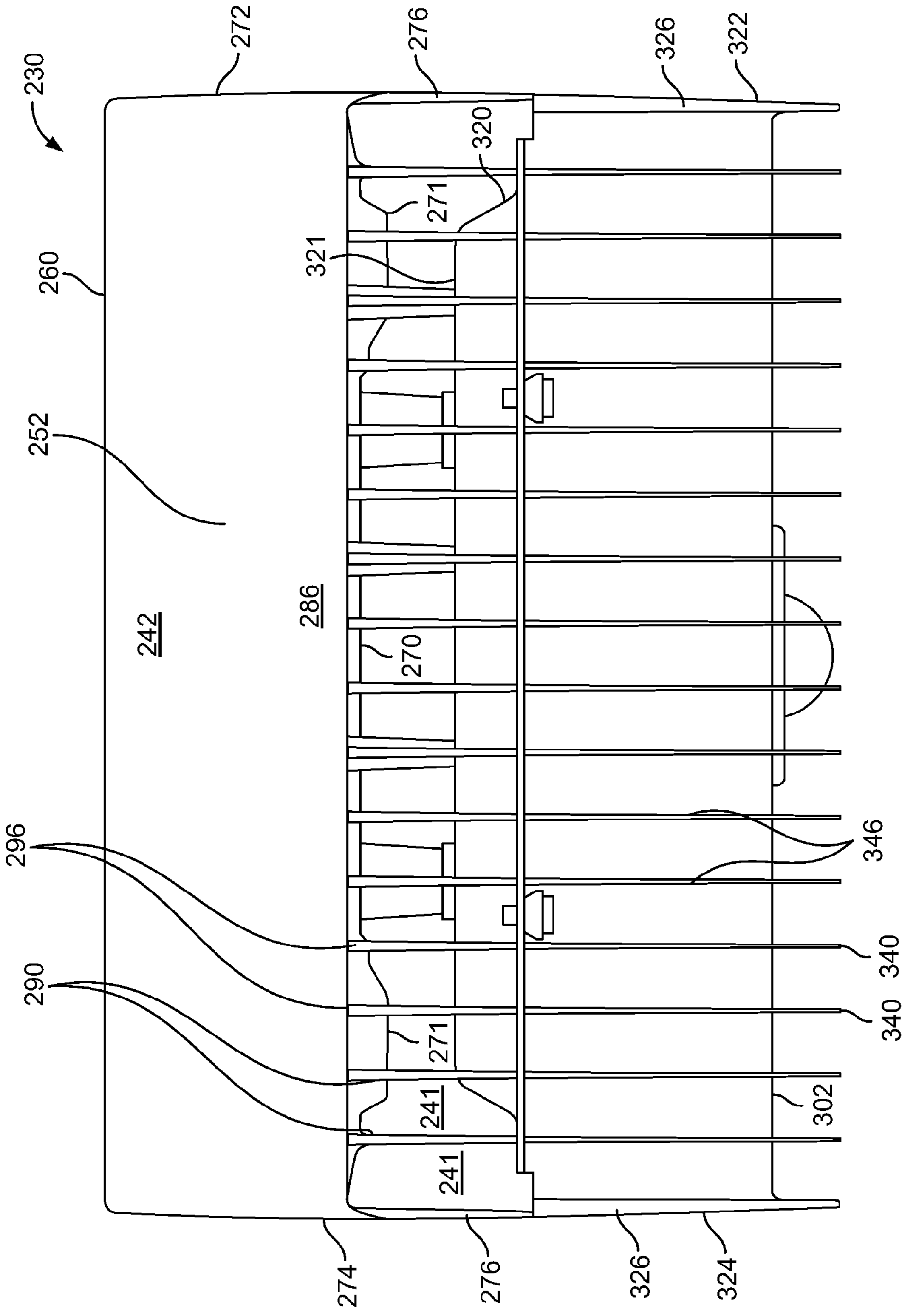
FIG. 12 is a top view of the lighting fixture of FIG. 9.
Figure 13:
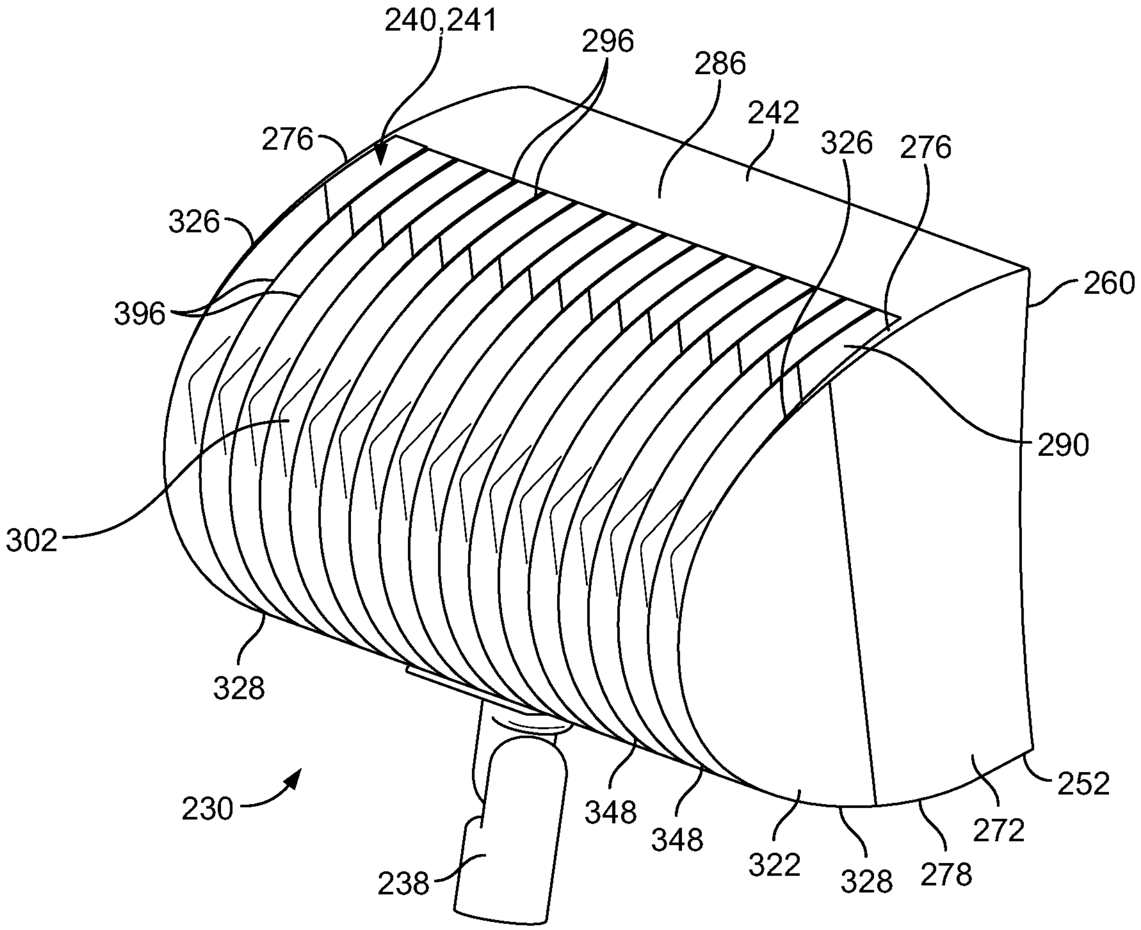
FIG. 13 is a left, rear perspective view of the lighting fixture of FIG. 9.
Figure 14:
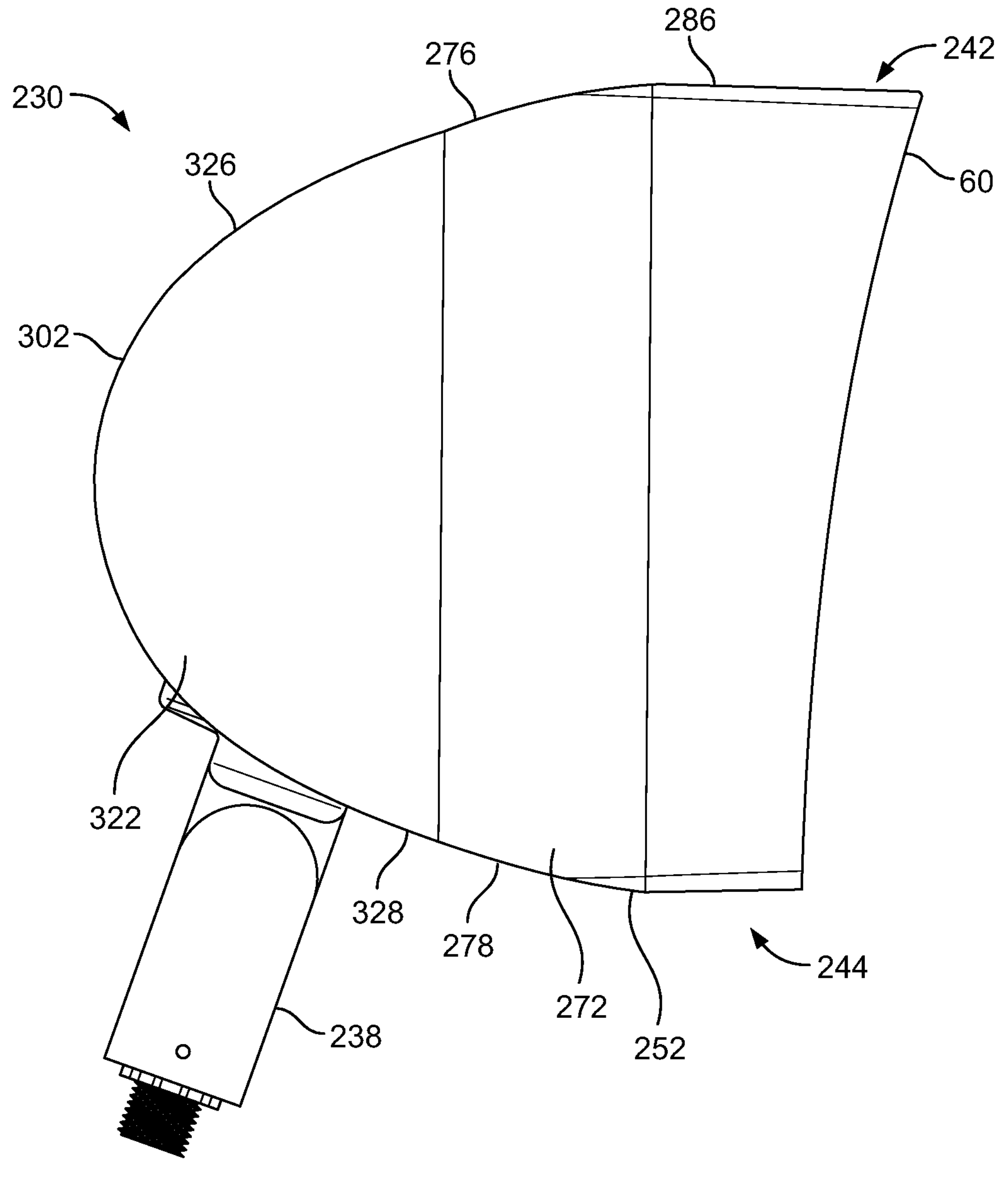
FIG. 14 is a left side view of the lighting fixture of FIG. 9.

Referring primarily to FIG. 14, and also for reference, FIGS. 10, 12, and 13, the emitter housing 252 also defines a rear surface 270, a left side 272, and a right side 274, and each of the left and right side define a top edge 276 and a bottom edge 278. The driver housing 302 defines a front surface 320, a left side 122, and a right side 124, and each of the left and right side define a top edge 326 and a bottom edge 328.

Referring to FIGS. 9 and 12, the airflow passage 240 is defined by a space between the rear surface 270 of the emitter housing 252, including intermediate protruding portions 271 of the rear surface, and the front surface 320, including intermediate protruding portions 321, of the driver housing 302. A first plurality of fins 290 are located in the airflow passage 240 and define vertical oriented airflow channels 241, the vertical oriented airflow channels open to a top side 242 and a bottom side 244 (FIG. 15) of the fixture 230. The plurality of fins 290 can be defined by the rear surface 270 of the emitter housing 52, thus, the plurality of fins 290 are in thermal conductivity with the emitter 234 mounted to the opposite side of the emitter housing 52.

In a second illustrative light fixture 230, a second plurality of fins 340 is defined by the driver housing 302. Top edges of the second plurality of fins can be coplanar with the top edges of the first plurality of fins.

Referring to FIG. 13, a top 242 of the light fixture 230 can be planar and defined by the top of first plurality of fins 290, the top of the second plurality of fins 340, and the top surface 286 of the emitter housing 252, which are all coplanar. The same can be true for a bottom 244 of the light fixture 230. More specifically, top edges 296 and bottom edges 298 are defined by each of the first plurality of fins 290. The top edges 296 of the first plurality of fins 290, the top edges 346 of the second plurality of fins, the top edges 276, 326 of the left side 272, 322 and the right side 274, 324 of the emitter housing 252 and the driver housing 302, are all coplanar, in this case on a curvilinear surface curving downward along a single axis in the direction from the hood 260 to the driver housing. Similarly, the bottom edges 298 of the first plurality of fins 290, the bottom edges 348 of the second plurality of fins 290, and the bottom edges 278, 328 of the left side 272, 322 and the right side 274, 324 of each of the emitter housing 252 and the driver housing 302, are coplanar, in this case on a curvilinear surface curving upward along a single axis in the direction from the hood 260 to the driver housing.

In the second illustrative embodiment 230, where a planar top 242 is defined by a top surface 286 of the emitter housing 252, and the top edges 296 of the plurality of fins 290 and the top edges 346 of the plurality of fins 340 are coplanar with the top surface 286 of the emitter housing. The top edges 296, 346 of fins 290, 340 being flush with one another and the top surfaces 286 provides a more aesthetically pleasing appearance, and lessen the likelihood that debris will catch among the interface between the fins 290, 340 and the top surface 286 they join and are flush rather than recessed or otherwise non-planar.

Figure 11:
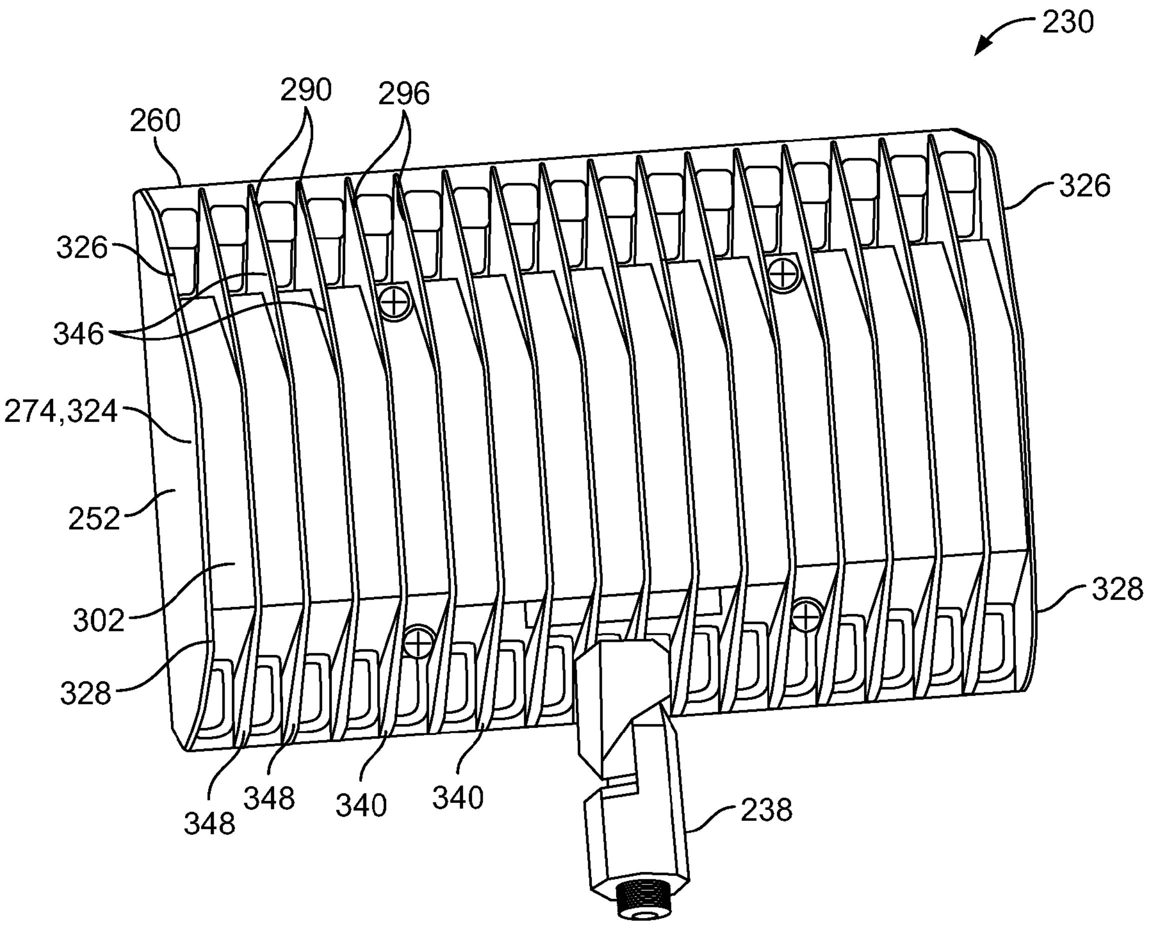
FIG. 11 is a rear perspective view of the emitter section of the lighting fixture of FIG. 9.
Figure 15:
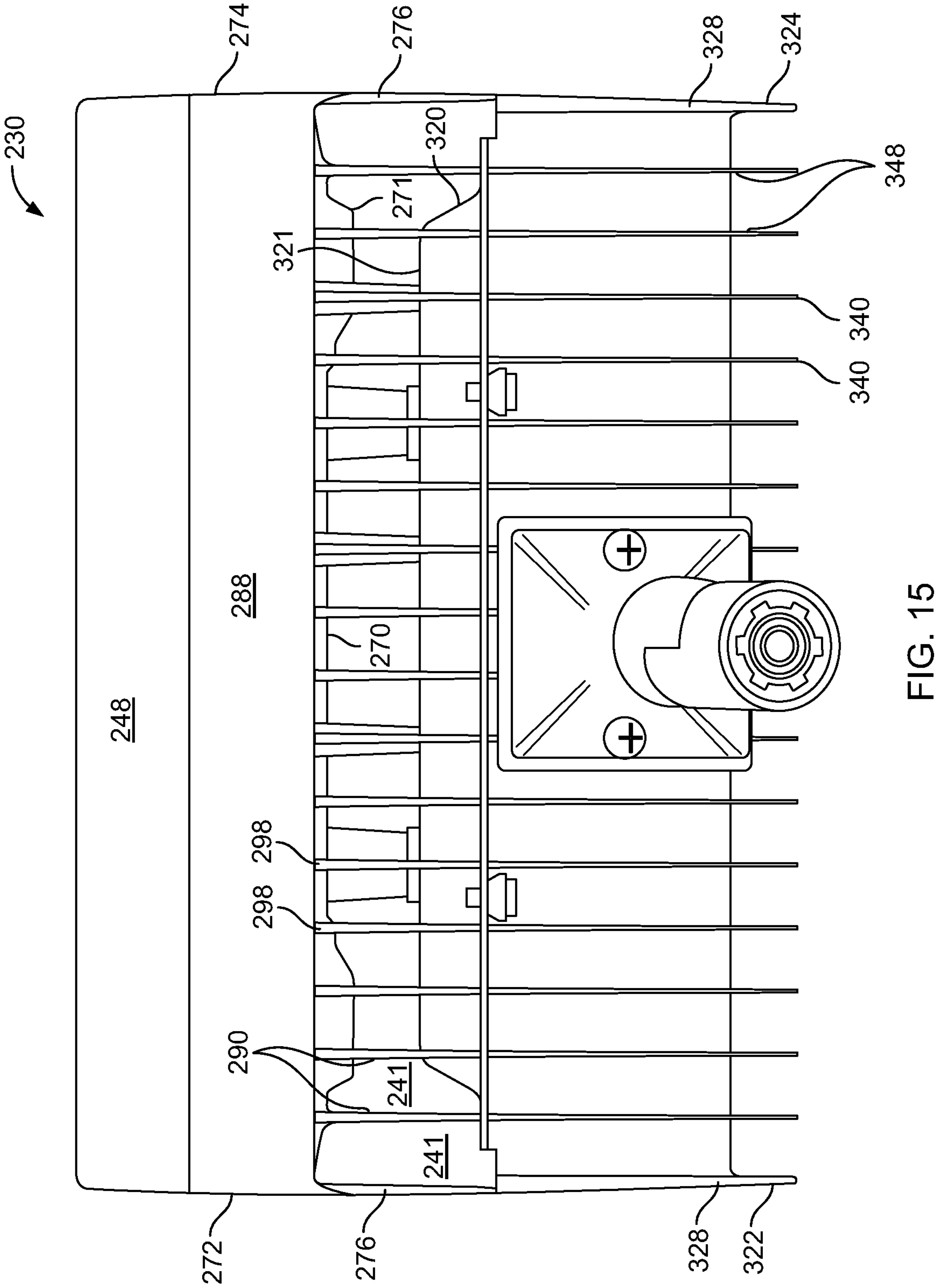
FIG. 15 is a bottom view of the lighting fixture of FIG. 9.

Referring to FIGS. 11 and 15, in the second illustrative embodiment 230, a planar bottom 244 is similarly defined by coplanar bottom surface 288 of the emitter housing 252, the bottom edges 298, 348 of the plurality of fins 290, 340.

The planes defined by top 242 and bottom 244 can be flat, about flat, or curvilinear, for example as in the case of the second illustrative light fixture 230. Additionally, the left sides 272 and 322 of the emitter and driver housings 252 and 302 can be coplanar, and the right sides 274 and 324 of the emitter and driver housings can be coplanar.

Referring to FIGS. 10, 13, and 14, in the second illustrative embodiment of the light fixture 230, the left sides 272 and 322 of the emitter and driver housings meet or nearly meet to enclose the airflow passage 240 on a left side, and the right sides 274 and 324 of the emitter and driver housings meet to enclose a right side of the airflow passage. The enclosing of the left sides 272, 322 and right sides 274, 324, and the top edges 276, 346 being coplanar with the top plane 242 and the bottom edges 278, 328 being coplanar with the bottom plane 244, provide visual shielding of the fins 290, 340 from the sides of the light fixture 230, enhancing its visual aesthetics as well as restricting airflow vertically within airflow passage 240, and preventing debris from entering airflow passage 240 from the left or right sides 272 and 274.

Although this invention has been described in certain specific illustrative embodiments, many additional modifications and variations would be apparent to those skilled in the art in light of this disclosure. It is, therefore, understood that this invention may be practiced otherwise than as specifically described. Thus, the illustrative embodiments should be considered in all respects to be illustrative and not restrictive, and the scope of the invention determined by any claims supportable by this application and equivalents thereof, rather than determined solely by the foregoing description.

The invention claimed is:

1. A light fixture for a light source having an emitter and driver, comprising:

an emitter housing defining an emitter mount, the emitter coupled to the emitter mount, the emitter housing defining a rear surface, a left side, and a right side, and wherein each of the left and right side define a top edge and a bottom edge;

a driver housing, the driver coupled to the driver housing, the driver housing defining a front surface, a left side, and a right side, and wherein each of the left and right side defining a top edge and a bottom edge;

an airflow passage defined by a space between the rear surface of the emitter housing and the front surface of the driver housing; and a first plurality of flattened fins located in the airflow passage and defining vertical oriented airflow channels, the vertical oriented airflow channels opening to a top side and a bottom side of the fixture, top and bottom edges defined by each of the first plurality of fins;

wherein the fins are oriented in a direction of airflow through the airflow channels;

and wherein the top edges of the first plurality of fins are coplanar with the top edges of the left side and the right side of the emitter housing.

2. The light fixture of claim 1, wherein:

at least a portion of each of the first plurality of fins span the space between the emitter housing and the driver housing; and the top edges of the first plurality of fins are coplanar with the top edges of the left side and the right side of the driver housing.

3. The light fixture of claim 1, wherein the plane defined by the top edges of the first plurality of fins and the top edges of the left and right sides of the driver housing and the emitter housing is curvilinear in a direction from a front of the emitter housing to a back of the driver housing.

4. The light fixture of claim 1, wherein the bottom edges of the first plurality of fins are coplanar with the bottom edges of the left side and the right side of each of the driver housing and the emitter housing.

5. The light fixture of claim 1, wherein the rear surface of the emitter housing defines the first plurality of fins on a side opposite the emitter, the first plurality of fins in thermal conductivity with the emitter mount.

6. The light fixture of claim 1, wherein:

the left sides of the emitter and driver housings are coplanar; and the right sides of the emitter and driver housings are coplanar.

7. The light fixture of claim 1, wherein:

the left sides of the emitter and driver housings enclose a left end of the airflow passage; and the right sides of the emitter and driver housings enclose a right end of the airflow passage.

8. The light fixture of claim 1, wherein:

the left sides of the emitter and driver housings define a left side opening of the airflow passage, the left side opening spanning from the top edges of the left sides to the bottom edges of the left sides; and the right sides of the emitter and driver housings define a right side opening of the airflow passage, the right side opening spanning from the top edges of the right sides to the bottom edges of the right sides.

9. The light fixture of claim 8, wherein the first plurality of fins are scalloped inward toward the emitter housing along their vertical length, the fins and the driver housing defining an open space that extends horizontally between the left side opening and right side opening of the fixture.

10. The light fixture of claim 1, wherein the first plurality of fins are evenly spaced.

11. The light fixture of claim 1, further comprising at least one fastener securing the emitter housing to the driver housing, and wherein the at least one fastener is fully enclosed by the emitter housing and the driver housing.

12. The light fixture of claim 1, further comprising a second plurality of fins defined by the driver housing.

13. The light fixture of claim 12, wherein each of the first plurality of fins is aligned with one of the second plurality of fins.

14. The light fixture of claim 11, wherein the top edges of the second plurality of fins are coplanar with the top edges of the first plurality of fins.

15. The light fixture of claim 1, further comprising a top surface defined by the emitter housing, and wherein the top edges of the first plurality of fins are coplanar with the top surface of the emitter housing.

16. The light fixture of claim 1, further comprising a top surface defined by the driver housing, and wherein the top edges of the first plurality of fins are coplanar with the top surface of the driver housing.

17. The light fixture of claim 1, wherein at least one of the rear surface of the emitter housing and the front surface of the driver housing is non-planar and projects into the airflow passage.

18. A light fixture for a light source having an emitter and driver, comprising:

an emitter housing defining an emitter mount, the emitter coupled to the emitter mount, the emitter housing defining a rear surface, a left side, a right side, and a top surface;

a driver housing, the driver coupled to the driver housing, the driver housing defining a front surface, a left side, and a right side;

an airflow passage defined by a space between the rear surface of the emitter housing and the front surface of the driver housing; and a first plurality of flattened fins located in the airflow passage and defining vertical oriented airflow channels, the vertical oriented airflow channels opening to a top side and a bottom side of the fixture, top and bottom edges defined by each of the first plurality of fins;

wherein the fins are oriented in a direction of airflow through the airflow channels;

and wherein the top edges of the first plurality of fins are coplanar with the top surface of the emitter housing.

19. The light fixture of claim 18, further comprising a second plurality of fins defined by the driver housing, and each of the second plurality of fins are aligned with one of the first plurality of fins.

20. The light fixture of claim 18, wherein:

at least a portion of each of the first plurality of fins span the space between the emitter housing and the driver housing; and the driver housing further defines a top surface and wherein the top edges of the first plurality of fins are coplanar with the top surface of the driver housing.

21. A light fixture for a light source having an emitter and driver, comprising:

an emitter housing defining an emitter mount, the emitter coupled to the emitter mount, the emitter housing defining a rear surface;

a driver housing, the driver coupled to the driver housing, the driver housing defining a front surface;

an airflow passage defined by a space between the rear surface of the emitter housing and the front surface of the driver housing; and a first plurality of flattened fins located in the airflow passage and defining vertical oriented airflow channels, the vertical oriented airflow channels opening to a top side and a bottom side of the fixture, top and bottom edges defined by each of the first plurality of fins;

wherein the fins are oriented in a direction of airflow through the airflow channels;

and wherein a top edge of at least one of the first plurality of fins is coplanar with a top surface of the emitter housing.

22. A light fixture for a light source having an emitter and driver, comprising:

an emitter section including an emitter mount, the emitter coupled to the emitter mount, the emitter section including a first surface;

a driver section, the driver positioned within the driver section and coupled to a second surface;

the fixture including a left side and a right side, wherein each of the left and right sides defines a top edge and a bottom edge;

an airflow passage defined by a space between the first surface and the second surface; and a first plurality of flattened fins located in the airflow passage and defining vertical oriented airflow channels, the vertical oriented airflow channels opening to a top side and a bottom side of the fixture, top and bottom edges defined by each of the first plurality of fins;

wherein the fins are oriented in a direction of airflow through the airflow channels;

wherein the top edges of the first plurality of fins are coplanar with the top edges of the left side and the right side of the fixture.

23. The light fixture of claim 22, wherein the bottom edges of the first plurality of fins are coplanar with the bottom edges of the left side and the right side of the fixture.

24. The light fixture of claim 22, wherein the first surface of the emitter section defines the first plurality of fins on a side opposite the emitter, the first plurality of fins in thermal conductivity with the emitter mount.

25. The light fixture of claim 22, wherein the first plurality of fins are evenly spaced.

* * * * *